United States Patent
Ross et al.

(10) Patent No.: US 7,783,305 B2
(45) Date of Patent: Aug. 24, 2010

(54) METHOD AND SYSTEM FOR PROVIDING MENU TREE ASSISTANCE

(75) Inventors: Steven J. Ross, Livonia, MI (US); Richard A. Johnson, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 1169 days.

(21) Appl. No.: 11/370,684

(22) Filed: Mar. 8, 2006

(65) Prior Publication Data

US 2007/0211880 A1 Sep. 13, 2007

(51) Int. Cl.
H04W 24/00 (2009.01)
(52) U.S. Cl. .............. 455/456.3; 340/426.18; 340/426.19; 340/426.2; 340/989; 370/352; 370/353; 370/354; 370/355; 370/356; 379/88.01; 379/88.02; 379/88.04; 379/88.07; 379/88.08; 455/404.1; 455/404.2; 455/414.1; 455/456.6; 704/270.1; 704/272; 704/273; 704/274; 704/275; 709/201; 709/202; 709/203
(58) Field of Classification Search . 340/426.18–426.2; 340/989; 370/351–356; 379/88.01–88.08; 455/404.1–404.2, 414.1, 456.3–456.6; 704/270.1–275; 709/201–203
See application file for complete search history.

(56) References Cited

U.S. PATENT DOCUMENTS

| | | | |
|---|---|---|---|
| 6,505,161 B1 | 1/2003 | Brems | |
| 6,973,387 B2 * | 12/2005 | Masclet et al. | 701/211 |
| 7,177,634 B2 * | 2/2007 | Wang et al. | 455/420 |
| 2004/0203634 A1 | 10/2004 | Wang et al. | |
| 2004/0203730 A1 | 10/2004 | Fraser et al. | |
| 2005/0108249 A1 * | 5/2005 | Schalk et al. | 707/10 |
| 2005/0197767 A1 * | 9/2005 | Nortrup | 701/209 |

OTHER PUBLICATIONS

U.S. Appl. No. 11/301,949, filed Dec. 13, 2005, Veliu, et al.
U.S. Appl. No. 11/126,596, filed May 11, 2005, Economos, et al.
U.S. Appl. No. 11/079,707, filed Mar. 14, 2005, Zambo, et al.
U.S. Appl. No. 10/970,946, filed Oct. 22, 2004, Zambo, et al.
U.S. Appl. No. 10/387,069, filed Mar. 12, 2003, Steven Ross, et al.
U.S. Appl. No. 11/168,583, filed Jun. 28, 2005, Steven Ross, et al.

(Continued)

Primary Examiner—Hemant Patel
(74) Attorney, Agent, or Firm—Anthony L. Simon; Reising Ethington P.C.

(57) ABSTRACT

A method for providing menu tree assistance includes receiving a voice request from a user via a telematics unit and a wireless network and determining a voice menu tree based on the voice request. The method further includes receiving at least one response based on the voice menu tree, determining a failure or confirmation based on the at least one response and converting the response to data based on the determined confirmation. The method further includes recording the response based on the determined failure and providing the recorded response and data to an advisor at a call center. A system and a computer readable medium including computer program code are also disclosed.

21 Claims, 7 Drawing Sheets

OTHER PUBLICATIONS

U.S. Appl. No. 11/088,504, filed Mar. 24, 2005, Oesterling, et al.
U.S. Appl. No. 10/193,799, filed Jul. 12, 2002, Oesterling, et al.
U.S. Appl. No. 11/227,752, filed Sep. 15, 2005, Groskeutz, et al.
U.S. Appl. No. 11/066,677, filed Feb. 22, 2005, Oesterling, et al.
469072 p. 713, May, 2003, Inverse word . . . .

* cited by examiner

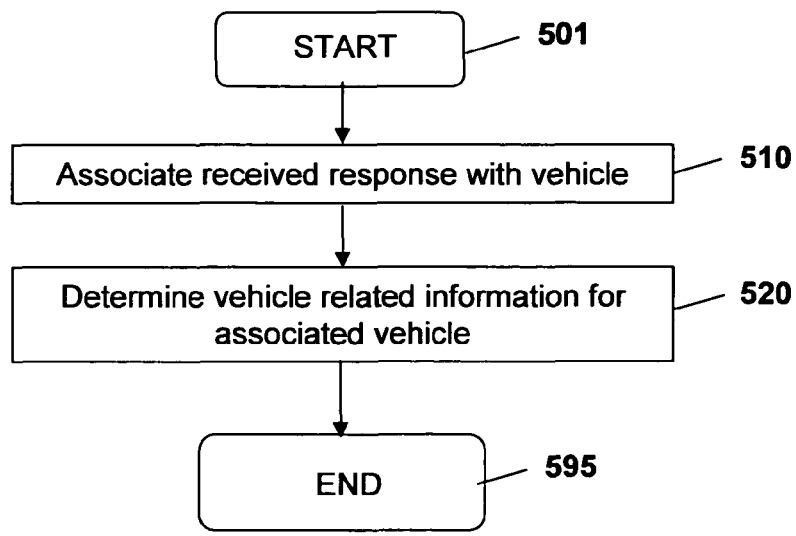
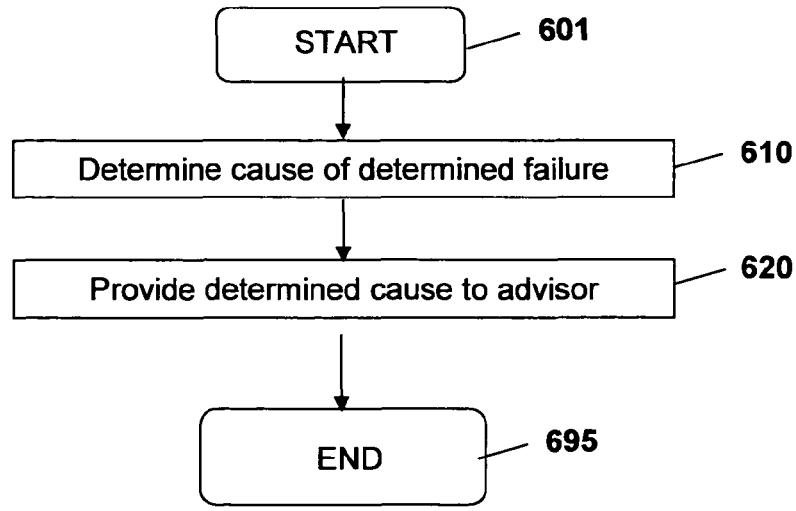

METHOD AND SYSTEM FOR PROVIDING MENU TREE ASSISTANCE

FIELD OF THE INVENTION

The present invention generally relates to voice recognition systems. More specifically, the present invention relates to providing menu tree assistance in voice recognition systems.

BACKGROUND OF THE INVENTION

Automating at least certain portions of customer service calls with speech recognition software can increase throughput of call centers. However, speech recognition software sometimes fails to properly translate spoken input for any number of reasons. When using voice menu trees, failure of the speech recognition engine can lead to increased customer frustration or dissatisfaction. Such problems can be pronounced once a customer has navigated through at least a portion of a menu tree and is forced to re-navigate topics. Voice menu trees are programs that guide a user through a series of options to assist in determining the desires of the user for goods and/or services. The user navigates the voice menu tree by uttering vocal commands that are received and parsed by a speech recognition engine.

Furthermore, if a subscriber is navigating a voice menu tree and encounters difficulty, the subscriber may become frustrated and terminate a call prematurely, only to attempt a second call shortly after termination. The present invention overcomes these disadvantages and advances the state of the art in voice menu tree systems.

SUMMARY OF THE INVENTION

One aspect of the present invention provides a method for providing menu tree assistance that includes receiving a voice request from a user via a telematics unit and a wireless network and determining a voice menu tree based on the voice request. The method further includes receiving at least one response based on the voice menu tree, determining a failure or confirmation based on the at least one response and converting the response to data based on the determined confirmation. The method further includes recording the response based on the determined failure and providing the recorded response and data to an advisor at a call center.

Another aspect of the invention provides a computer readable medium including computer readable code for providing menu tree assistance. The medium includes computer readable code for receiving a voice request from a user via a telematics unit and a wireless network and computer readable code for determining a voice menu tree based on the voice request. The medium further includes computer readable code for receiving at least one response based on the voice menu tree, computer readable code for determining a failure or confirmation based on the at least one response and computer readable code for converting the response to data based on the determined confirmation. The medium further includes computer readable code for recording the response based on the determined failure and computer readable code for providing the recorded response and data to an advisor at a call center.

Another aspect of the invention provides a system for providing menu tree assistance. The system includes means for receiving a voice request from a user via a telematics unit and a wireless network and means for determining a voice menu tree based on the voice request. The system further includes means for receiving at least one response based on the voice menu tree, means for determining a failure or confirmation based on the at least one response and means for converting the response to data based on the determined confirmation. The system further includes means for recording the response based on the determined failure and means for providing the recorded response and data to an advisor at a call center.

The aforementioned and other features and advantages of the invention will become further apparent from the following detailed description of the presently preferred embodiments, read in conjunction with the accompanying drawings. The detailed description and drawings are merely illustrative of the invention rather than limiting the scope of the invention being defined by the appended claims and equivalents thereof.

BRIEF DESCRIPTION OF THE DRAWINGS

FIG. 5 illustrates another embodiment of a method for providing menu tree assistance in accordance with the instant invention;

FIG. 6 illustrates another embodiment of a method for providing menu tree assistance in accordance with the instant invention.

DETAILED DESCRIPTION OF THE PREFERRED EMBODIMENTS

Figure 1:
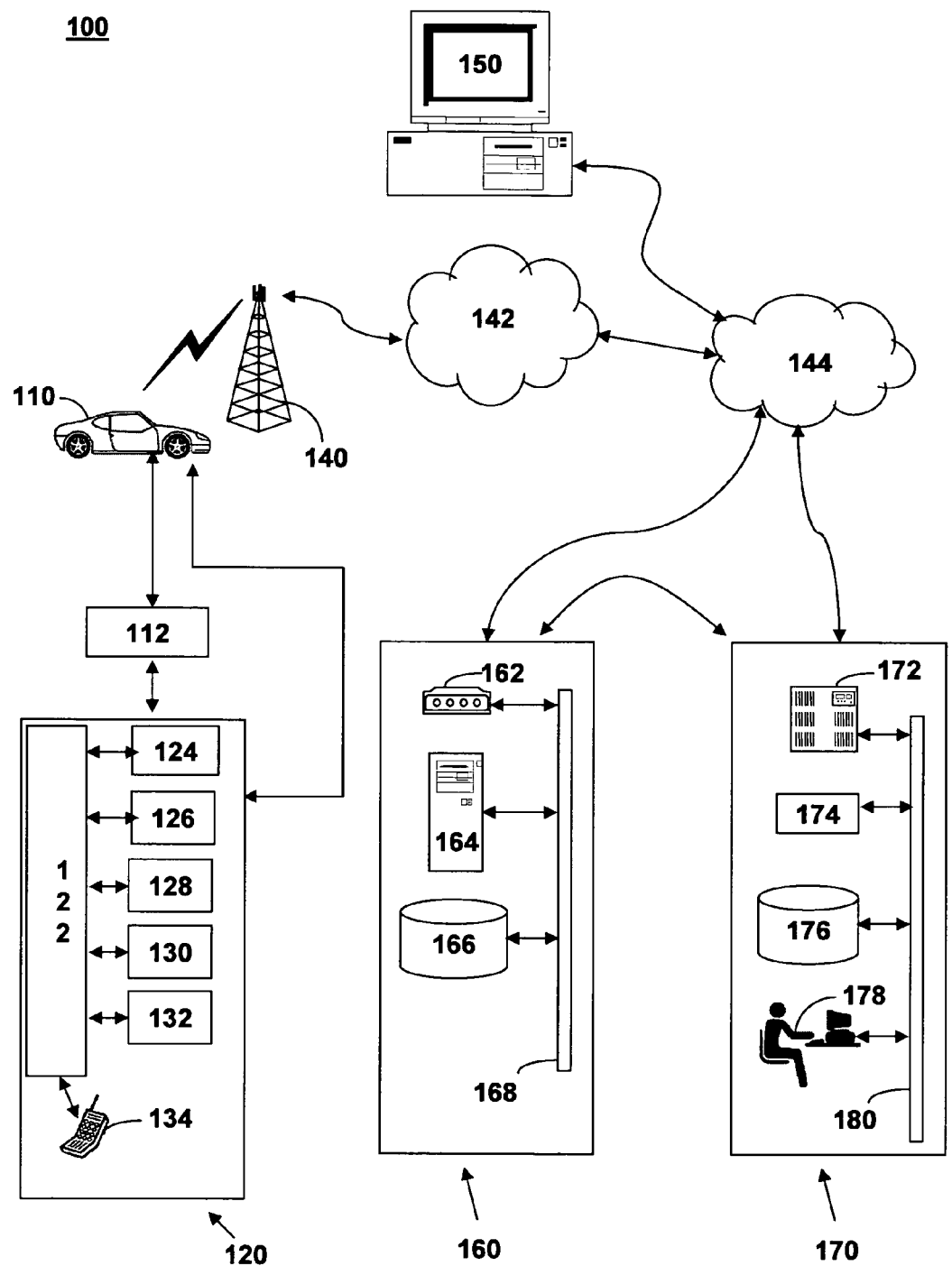
FIG. 1 illustrates an operating environment for a method for providing menu tree assistance.

FIG. 1 illustrates an operating environment for a method for providing menu tree assistance within a mobile vehicle communication system ("MVCS") 100. MVCS 100 includes a mobile vehicle communication unit ("MVCU") 110, a vehicle communication network 112, a telematics unit 120, one or more wireless carrier systems 140, one or more communication networks 142, one or more land networks 144, one or more client, personal or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is also referred to as a mobile vehicle in the discussion below. In operation, MVCU 110 may be implemented as a motor vehicle, marine vehicle or as an aircraft. MVCU 110 may include additional components not relevant to the present discussion.

Vehicle communication network 112 sends signals to various units of equipment and systems within vehicle 110 to perform various functions such as monitoring the operational state of vehicle systems, collecting and storing data from the vehicle systems, providing instructions, data and programs to various vehicle systems, and calling from telematics unit 120. In facilitating interactions among the various communication and electronic modules, vehicle communication network 112 utilizes interfaces such as controller-area network (CAN), Media Oriented System Transport (MOST), Local Interconnect Network (LIN), Ethernet (10 base T, 100 base T), International Organization for Standardization (ISO) Standard 9141, ISO Standard 11898 for high-speed applications, ISO Standard 11519 for lower speed applications, and Society of Automotive Engineers (SAE) standard J1850 for higher and lower speed applications. In one embodiment, vehicle communication network 112 is a direct connection between connected devices.

Telematics unit 120 sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system ("GPS") unit 126, an in-vehicle memory 128, a microphone 130, one or more speakers 132, and an embedded or in-vehicle mobile phone 134. In other embodiments, telematics unit 120 may be implemented without one or more of the above listed components such as, for example, speakers 132. In this example, the vehicle 110 audio system speakers may be used if so equipped. Telematics unit 120 may include additional components not relevant to the present discussion. Telematics unit 120 is one example of a vehicle module.

In one embodiment, processor 122 is implemented as a microcontroller, controller, host processor, or vehicle communications processor. In one embodiment, processor 122 is a digital signal processor. In an example, processor 122 is implemented as an application specific integrated circuit. In another embodiment, processor 122 is implemented as a processor working in conjunction with a central processing unit performing the function of a general purpose processor. GPS unit 126 provides longitude and latitude coordinates of the vehicle responsive to a GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communication (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and vehicle communication network 112 that is connected to various electronic modules in the vehicle. In one embodiment, these digital signals activate the programming mode and operation modes, as well as provide data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band of 2.3 GHz that has been allocated by the U.S. Federal Communications Commission for nationwide broadcasting of satellite-based Digital Audio Radio Service.

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In an example, processor 122 implements data packets received by telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network. In another embodiment, land network 144 is implemented as an Internet Protocol ("IP") network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browsers and Internet-access computer programs for sending and receiving data over land network 144 and, optionally, wired or wireless communication networks 142 to web-hosting portal 160 through a web-page interface using communication standards such as hypertext transport protocol, and transport-control protocol and Internet protocol. In one embodiment, the data include directives to change certain programming and operational modes of electronic and mechanical systems within MVCU 110.

In operation, a client utilizes computer 150 to initiate setting or re-setting of user preferences for MVCU 110. In an example, a client utilizes computer 150 to provide radio station presets as user preferences for MVCU 110. User-preference data from client-side software is transmitted to server-side software of web-hosting portal 160. In an example, user-preference data are stored at web-hosting portal 160.

Web-hosting portal 160 includes one or more data modems 162, one or more web-servers 164, one or more databases 166, and a network system 168. Web-hosting portal 160 is connected directly by wire to call center 170, or connected by phone lines to land network 144, which is connected to call center 170. In an example, web-hosting portal 160 connects to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that are then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web server 164 hosting portal 160 through a wireless communication network 142 and a land network 144. Data are received by land network 144 and sent to one or more web servers 164. In one embodiment, web server 164 is implemented as any suitable hardware and software capable of providing web server 164 services to help change and transmit personal preference settings from a client at computer 150 to telematics unit 120. Web server 164 sends to or receives from one or more databases 166 data transmissions via network system 168. Web server 164 includes computer applications and files for managing and storing personalized settings supplied by the client, such as door lock/unlock behavior, radio station preset selections, climate controls, custom button configurations, and theft alarm settings. For each client, the web server 164 potentially stores hundreds of preferences for wireless vehicle communication, networking, maintenance and diagnostic services for a mobile vehicle. In another embodiment, web server 164 further includes data for managing turn-by-turn navigational instructions.

In one embodiment, one or more web servers 164 are networked via network system 168 to distribute user-preference data among its network components such as databases 166. In an example, database 166 is a part of or a separate computer from web server 164. Web server 164 sends data transmission with user preferences to call center 170 through land network 144.

Call center 170 is a location where many calls are received and serviced at the same time, or where many calls are sent at the same time. In one embodiment, the call center is a telematics call center facilitating communications to and from telematics unit 120. In another embodiment, the call center is a voice call center, providing verbal communications between an advisor in the call center and a subscriber in a mobile vehicle. In yet another embodiment, the call center contains each of these functions. In other embodiments, call center 170 and web server 164 and hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web server 164 and hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmission via network system 180. In one embodiment, communication services manager 174 includes at least one analog and/or digital modem.

Communication services manager 174 sends to or receives from one or more communication services advisors 178 data transmission via network system 180. Communication services database 176 sends or receives from communication services advisor 178 data transmissions via network system 180. Communication services advisor 178 receives from or sends to switch 172 voice or data transmissions. Communication services manager 174 provides one or more of a variety of services including initiating data over voice channel wireless communication, enrollment services, navigation assistance, directory assistance, roadside assistance, business or residential assistance, information services assistance, emergency assistance, and communications assistance.

Communication services manager 174 receives service-preference requests for a variety of services from the client computer 150, web server 164, hosting portal 160, and land network 144. Communication services manager 174 transmits user-preference and other data such as, for example, primary diagnostic script to telematics unit 120 through wireless carrier system 140, communication network 142, land network 144, voice and data switch 172, and network system 180. Communication services manager 174 stores or retrieves data and information from communication services database 176. Communication services manager 174 may provide requested information to communication services advisor 178. In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

In operation, an incoming call is routed to a telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140, and satellite broadcast system 146. In this embodiment, an inbound communication is routed to call center 170 from telematics unit 120 via wireless carrier system 140, communication network 142, and land network 144.

Figure 2:
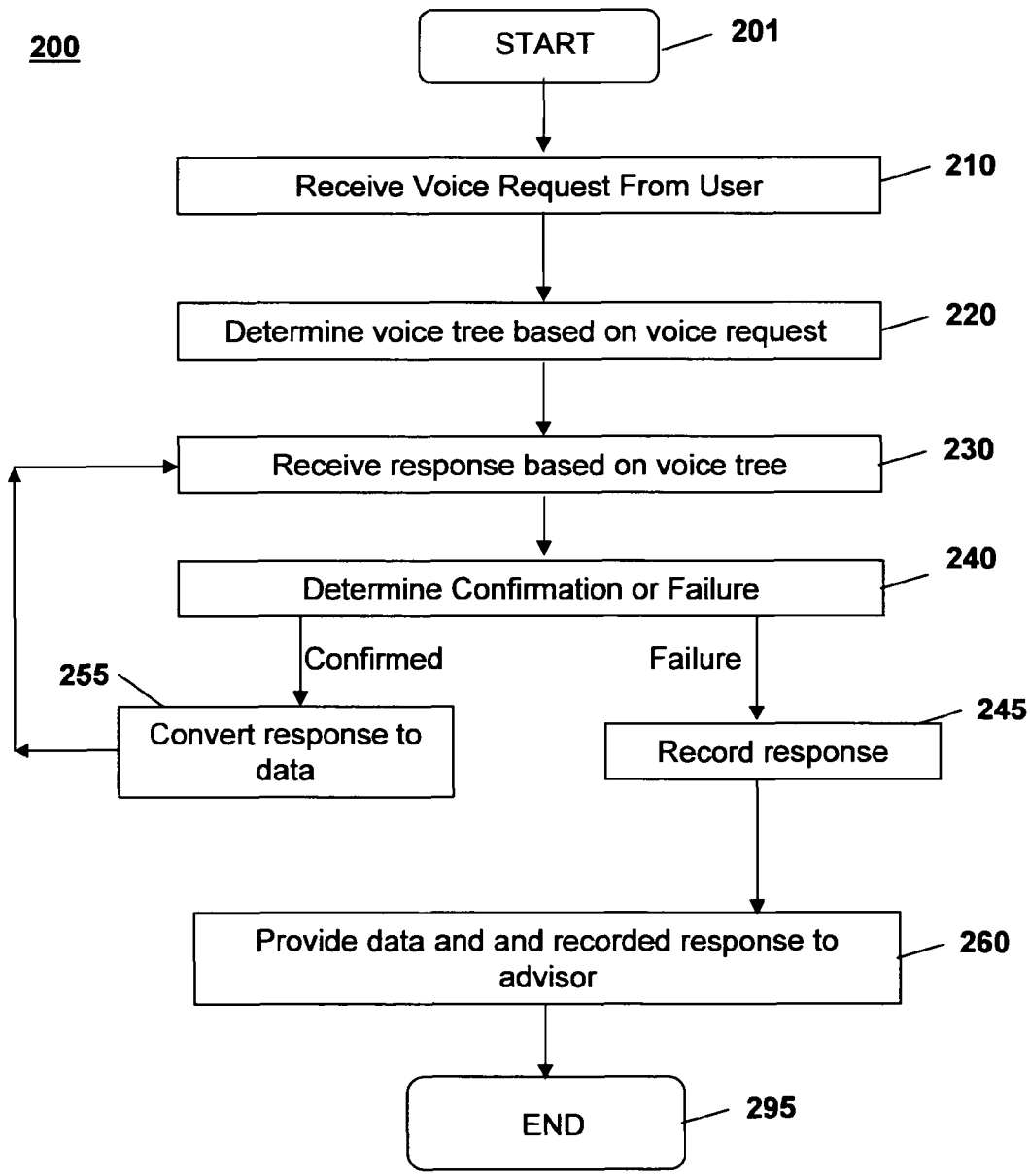
FIG. 2 illustrates one embodiment of a method for providing menu tree assistance in accordance with the instant invention.

FIG. 2 illustrates one embodiment of a method 200 for providing menu tree assistance in accordance with the instant invention. Method 200 begins at 201.

A speech recognition engine ("SRE") receives a voice request from a user at step 210. The SRE is located at a call center or at a location in communication with the call center 170 in one exemplary embodiment. The SRE can also be located within a motor vehicle 110, such as in the telematics unit 120, in another example. For example, the SRE can either receive the voice request via a wireless connection. In an alternate example, the SRE receives the voice request directly via a wired connection within a mobile vehicle. The voice request is received via a telematics unit and a wireless network in embodiments where the SRE is physically isolated from the telematics unit. The voice request is received, for example, based on an incoming voice or data connection. The voice request can be, for example, associated with a unique identifier, such as Automatic Number Information ("ANI", also known as 'caller ID'), a vehicle serial number, an account number, or a serial number of a product.

Based on the received voice request, the SRE determines a voice menu tree at step 220. For example, the SRE can include a number of voice menu trees configured to accomplish a variety of tasks, and the SRE then determines one voice menu tree from a plurality of voice menu trees. Exemplary voice menu tree tasks include navigational instructions, vehicle operational controls such as door unlock, and purchasing communication time.

Once the voice menu tree has been identified, a first voice menu tree item is provided to the user via the wireless network. For example, the first voice menu tree item in a navigation voice menu tree prompts the user to say "directions" or "advisor" to start the data entry.

The SRE receives at least one response to the voice menu tree item at step 230. The response is received via the wireless network for example. Based on the received response, the SRE determines a failure or confirmation at step 240. If the SRE understands the received response, the SRE determines a confirmation 255. If the SRE is unable to understand the received response, the SRE determines a failure 245.

Failure or confirmation can result from several factors, including signal interference, static, speaker-specific vocal patterns or the like. In the event of a failure determination, the SRE may provide for at least one additional attempt (n number of attempts) to understand the response and only determine a 'failure' based on repeated failures.

Based on a confirmation of the response at step 240, the response is converted to data at step 255. For example, in a navigation voice menu tree, the user responded "directions." Based on the confirmed response "directions," the SRE converts the "directions" to data and navigates through the navigation voice menu tree based on this confirmation, and stores the data in a database or other storage device. For example, this confirmation can be stored in a state machine.

Based on converting the response to data at step 255, the SRE returns to step 230, and provides a second voice menu tree item (such as "address or place") to the user, receives a second response and determines failure or confirmation of the second response at step 240.

Upon determining a failure, the response is recorded at step 245. The recorded response is stored in any appropriate audio file, such as .mp3, .ogg, .wma or the like. The stored recorded response is associated with any stored data from previous responses, and the data and stored response are provided to an advisor at a call center at step 260.

The data and stored response are provided to the advisor substantially simultaneously. For example, the data is provided in a transfer form and the stored response is associated with the form. Upon providing the transfer form with the stored response, the stored data can be displayed on a screen while the stored response plays (also termed 'whispered') to the advisor. In one example, a screen display for the advisor is automatically populated with known information from iterations of the voice menu tree.

Figure 2A:
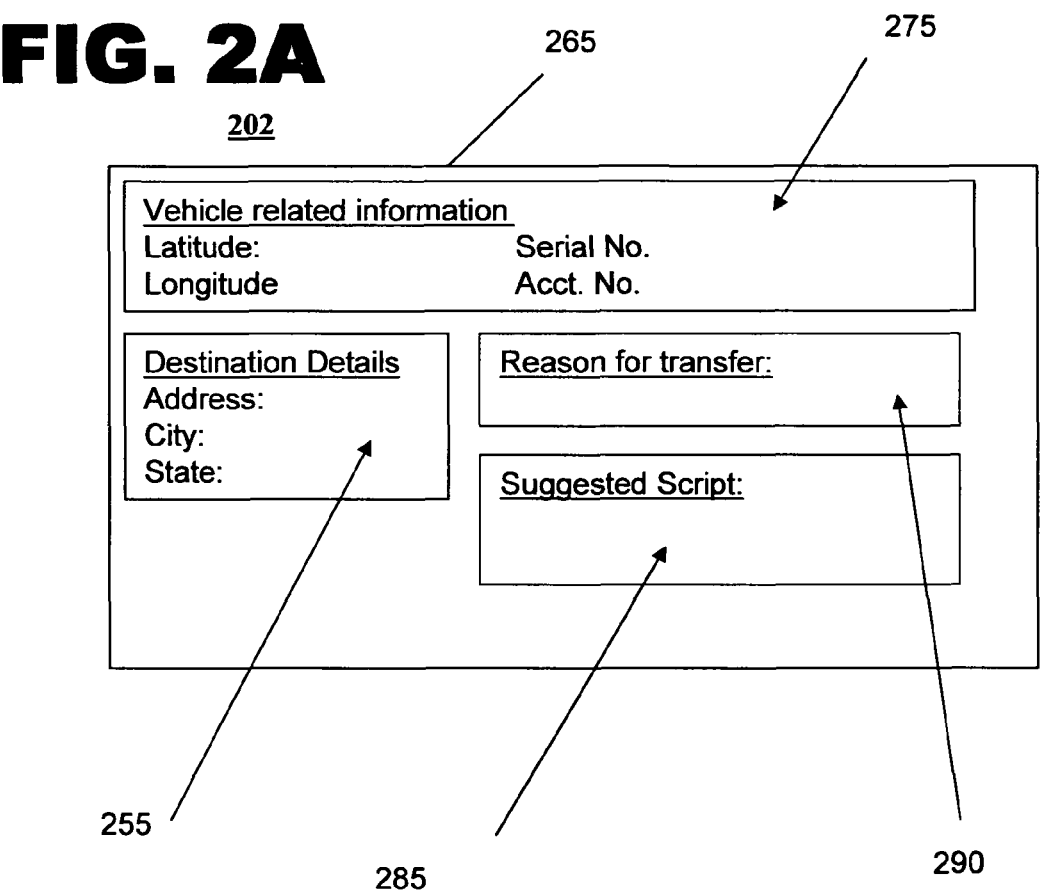
FIG. 2A illustrates an exemplary screen window, in accordance with one aspect of the invention.

One example of an advisor screen display 202 is shown at FIG. 2A. Display 202 displays data in, for example, a window 265 including destination details 255. Destination details 255 include any stored data that was stored prior to the failure determination. Vehicle related information 275 is displayed on screen display 202. Vehicle related information includes any information determined based on the source of the request, such as the vehicle current location (latitude and longitude or map information), vehicle serial number, and/or customer account number. Other information can also be displayed or prepared to be ready to display, such as customer search history, other addresses, home and/or business addresses, phone numbers for the customer, and other such information. Window 265 can be a plurality of windows, tabbed windows, or any other appropriate GUI technique. In other examples, a suggested script 285 is displayed in window 265, such as "It sounds like you are looking for an address on Woodward Avenue in Detroit Mich." or "How may I help you?" In another example, display 202 includes a reason for transfer 290, such as "low signal level," "static,""address entered but not verified" or the like. Method 200 ends at 295.

Figure 3:
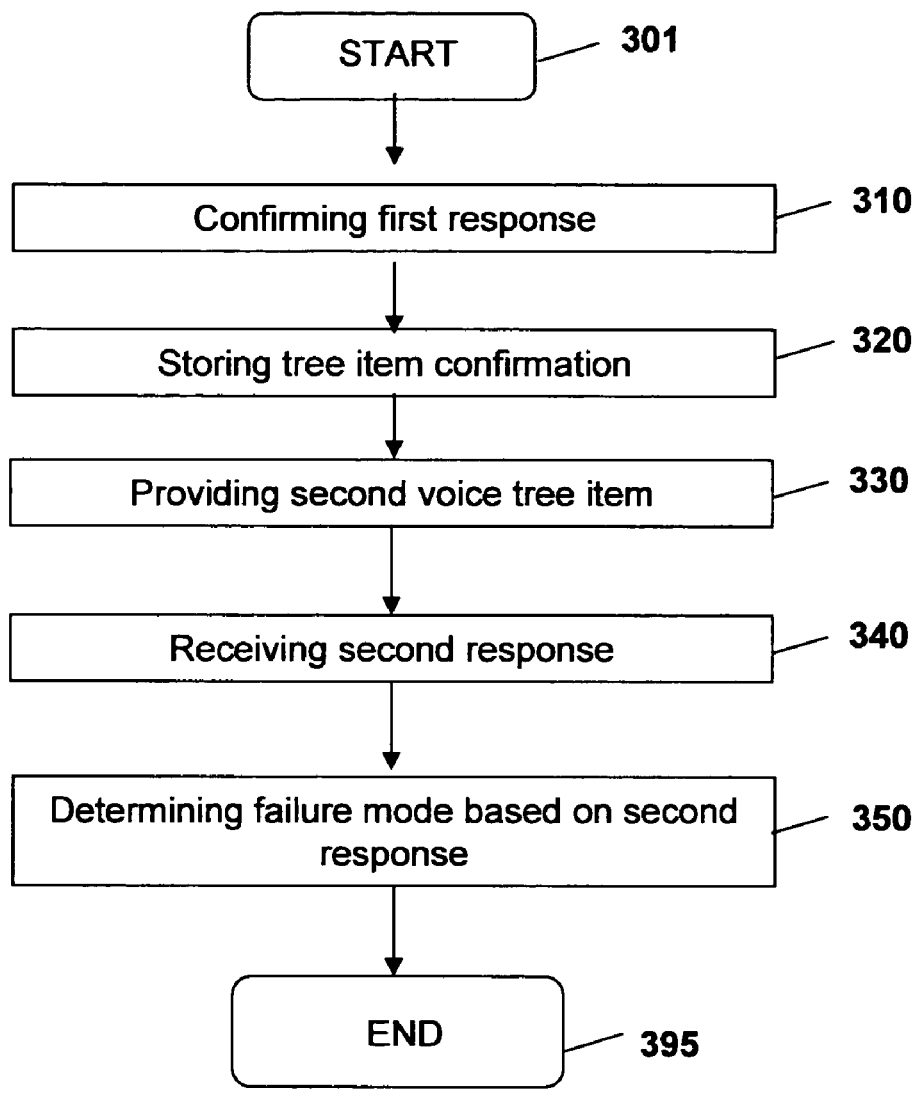
FIG. 3 illustrates another embodiment of a method for providing menu tree assistance in accordance with the instant invention.

FIG. 3 illustrates one embodiment of a method 300 for determining failure or confirmation in accordance with one aspect of the invention. For example, method 300 can be implemented during step 240 of method 200. Method 300 begins at 301.

The SRE confirms a first response at step 310. Confirming the first response is the result of the SRE successfully parsing the first response and converting the first response into data. A tree item confirmation based on the confirmed first response is stored at step 320. The tree item confirmation can include a state change indicator, for example, or the tree item confirmation can include the actual data to be passed forward in an iterative process. Alternatively, the tree item confirmation can include a pointer directed to a memory location.

After storing the tree item confirmation, the SRE provides a second voice menu tree item at step 330, and receives a second response at step 340. The second voice menu tree item is a voice menu tree item selected based on the response to the first voice menu tree item.

Based on the received second response, the SRE determines a failure mode, including a confirmation or failure, at step 350. In the event of a confirmation, the SRE iterates through the voice menu tree until the SRE provides the desired information. In the event of a failure determination, method 300 ends at 395 and continues at, for example, step 245 of method 200.

Figure 4:
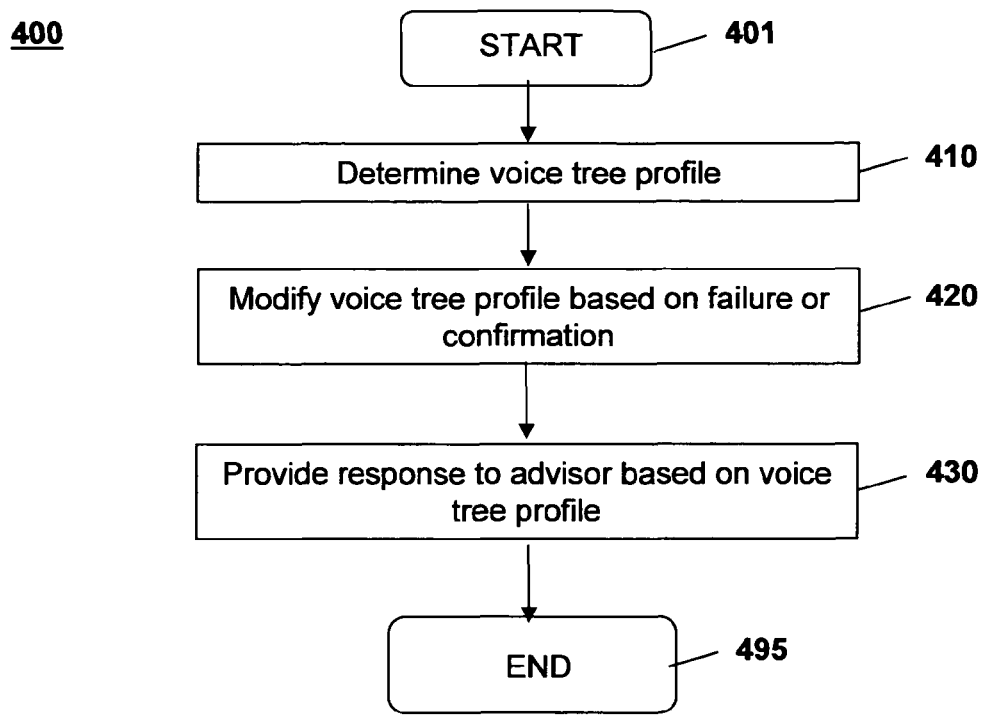
FIG. 4 illustrates another embodiment of a method for providing menu tree assistance in accordance with the instant invention.

FIG. 4 illustrates an exemplary method 400 for providing voice menu tree assistance based on a profile in accordance with one aspect of the invention. Method 400 begins at 401. A voice menu tree profile is determined at step 410. The voice menu tree profile is data indicative of a user's previous usage of at least one of the plurality of voice menu trees controlled by the SRE. For example, the voice menu tree profile can indicate that a particular user often seeks directions within a particular city or state, or that the SRE has difficulty parsing certain words that the user has previously uttered. The voice menu tree profile can be determined based on speech recognition, user identification number, vehicle serial number, account numbers or the like.

The SRE modifies the voice menu tree profile at step 420 based on the failure or confirmation determined in, for example, step 245 of method 200. Modifying the voice menu tree profile can include tracking a history of the user's voice menu tree usage and tracking successful confirmations or determined failures and the outcome of any determined failures.

Method 400 then provides the stored response (step 260) to the advisor based on the voice menu tree profile at step 430. The modified voice menu tree profile can also be transmitted to a mobile vehicle 110 via a wireless network. Alternatively, the modified voice menu tree profile is stored within the call center 170 or another location connected to, or in communication with, the SRE. Method 400 ends at 495.

FIG. 5 illustrates one embodiment of a method 500 for determining vehicle related information in accordance with one aspect of the invention. Method 500 begins at 501. Based on receiving a response, the SRE associates the received response with a vehicle at step 510. In one embodiment, the association is based on an identifier, such as ANI, user account number, serial number, or the like. Based on the association, the SRE determines vehicle related information for the associated vehicle at step 520. The determination can include requesting certain information from the vehicle 110 via wireless network. For example, the SRE can request that the vehicle 110 determine the GPS location and transmit the location to the SRE. In another example, the SRE can attempt to determine vehicle speed and/or heading, as well as a windows up/down, window wipers status, driver seat vertical orientation, air bag status, audiovisual device status including volume, or the like. In another example, the SRE can request the vehicle transmit recent service records to the SRE. Method 500 ends at 595.

FIG. 6 illustrates one example of a method 600 for providing voice menu tree assistance in accordance with one aspect of the invention. Method 600 begins at step 601. At step 610, method 600 determines the cause of the determined failure. The determination can include analysis of the signal strength, indications of static, previous difficulties such as with a voice menu tree profile, or an indication of the user's location in the voice menu tree. The determined cause is provided to the advisor with the data and stored response at step 620. Method 600 ends at 695.

Figure 7:
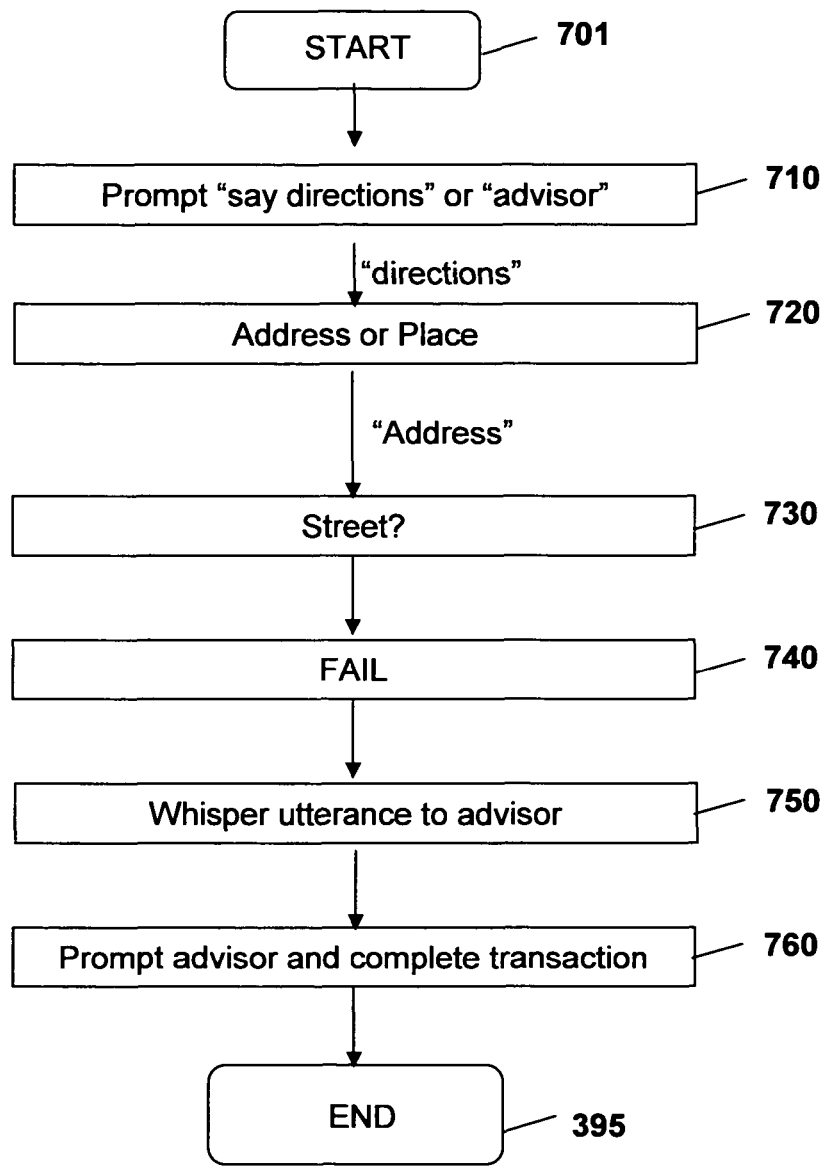
FIG. 7 illustrates another embodiment of a method for providing menu tree assistance in accordance with the instant invention.

FIG. 7 illustrates an exemplary iteration of the methods disclosed herein at 700. Method 700 begins at 701, and continues at 710 after the SRE receives a request from a user. The SRE prompts the user to "say directions or advisor" to determine which voice menu tree to provide the user at step 710. In the iteration depicted in FIG. 7, the SRE receives a "directions" response, and continues at step 720 to determined the desired "address or place" for the directions. Based on receiving "address" and confirming the response, the SRE requests "street?" at step 730. At step 740, the SRE enters a failure mode based on a failure to parse the user's response to the "street" step 730 inquiry. Based on the failure mode, the user's response to the step 730 inquiry is recorded and whispered to the advisor, along with a display of the data that the user is seeking directions to an address at step 750. Previously uttered data, for example a city and state, is preserved in a temporary data store, such as, for example, in the communications service database (FIG. 1, 176), and made available to the advisor. The advisor is prompted and the transaction is completed at step 760. Completing the transaction includes providing the desired information, such as directions, to the user.

The response need not be provided to the advisor solely upon receiving a failure notification. In particular, the SRE may whisper the user's responses to an advisor without the user being aware of the advisor's participation in the process. Such actions, for example, can be implemented based on a users' voice menu tree profile. Based on receiving the whispered response and the data, the advisor can determine if further information is needed or if the desired services can be provided to the user without announcing the presence of the advisor. For example, the advisor can listen to the whispered response and enter any data required to provide the desired information to the user. For example, if the user is attempting to secure directions to 1234 Main Street, but the SRE fails to parse the statement "1234", the advisor can type the "1234" based on the whispered response into the navigation system rather than provide the user with a vocal interaction.

The present invention may be embodied in other specific forms without departing from the spirit or essential characteristics. The described embodiments are to be considered in all respects only as illustrative and not restrictive.

What is claimed is:

1. A method for providing menu tree assistance, the method comprising:
   receiving a voice request from a user via a telematics unit;
   determining a voice menu tree based on the voice request;
   receiving at least one voice response from the user based on the voice menu tree;
   attempting speech recognition on the voice response;
   determining a speech recognition failure based on the voice response; and thereafter:
   sending the received voice response as an audio file to a call center via a wireless carrier system;
   playing the voice response to an advisor at the call center; and
   providing assistance to the user from the call center in response to the playing of the voice response.

2. The method of claim 1, wherein the method further comprises, after the step of determining a voice menu tree and prior to the step of receiving at least one voice response, carrying out at least one iteration of the following steps (i) through (iii):
   (i) receiving a voice input from the user;
   (ii) carrying out speech recognition on the voice input; and
   (iii) prompting the user for subsequent input based on a successful confirmation of the speech recognition; and
   wherein the step of receiving at least one voice response further comprises receiving the voice response after prompting the user for subsequent input.

3. The method of claim 2, further comprising the step of obtaining data concerning usage of the voice menu tree, and wherein the sending step further comprises sending the data to the call center, and wherein the method further comprises the step of providing a screen display to the advisor using the data.

4. The method of claim 3, wherein the step of providing a screen display further comprises providing a script for use by the advisor in providing assistance to the user.

5. The method of claim 3, wherein the steps of playing the voice response and providing a screen display together further comprise the step of providing the screen display while playing the voice response to the advisor.

6. The method of claim 1, wherein the playing step further comprises playing the voice response to a live advisor at the call center.

7. The method of claim 1, further comprising the step of sending vehicle-related information to the call center.

8. The method of claim 7, wherein the vehicle-related information further comprises the location of a vehicle.

9. The method of claim 1, wherein the determining and attempting steps are carried out at a vehicle using a speech recognition engine.

10. A method for providing menu tree assistance, the method comprising:
   (a) receiving a voice request from a user via a vehicle telematics unit;
   (b) providing at least one voice menu tree of user-selectable options in response to the voice request;
   (c) receiving from the user a voice response to the provided voice menu tree of user-selectable options;
   (d) attempting speech recognition on the voice response received from the user;
   (e) storing a previous usage of at least one voice menu tree by the user; and
   (f) if the attempted speech recognition is unable to recognize the voice response, then sending the voice response and the stored previous usage to a call center via a wireless carrier system.

11. The method of claim 10, further comprising the step of receiving the voice request from a user at a vehicle telematics unit.

12. The method of claim 10, further comprising the step of displaying the stored previous usage of at least one voice menu tree by the user on a display at the call center.

13. The method of claim 10, further comprising the step of audibly playing the sent voice response at the call center.

14. The method of claim 10, further comprising the step of generating a suggested script for an advisor to recite to the user.

15. The method of claim 10, further comprising the step of sending vehicle-related information to the call center.

16. The method of claim 15, wherein vehicle-related information further comprises the location of a vehicle.

17. The method of claim 10, further comprising recording the voice response based on the inability of the attempted speech recognition to recognize the verbal response.

18. A method for providing menu tree assistance, the method comprising:
   (a) receiving a voice request from a user at a vehicle telematics unit;
   (b) providing at least one voice menu tree of user-selectable options in response to the voice request;
   (c) receiving from the user a voice response to the provided voice menu tree of options;
   (d) attempting speech recognition on the received voice response;
   (e) storing a previous usage of at least one voice menu tree by the user; and
   (f) if the attempted speech recognition is unable to recognize the voice response,
      (i) sending the voice response and the stored previous usage to a call center via a wireless carrier system;
      (ii) audibly playing the voice response for an advisor; and
      (iii) displaying the previous usage of at least one voice menu tree by the user on a screen display in the call center.

19. The method of claim 18, further comprising the step of generating a suggested script for an advisor to recite to the user.

20. The method of claim 18, further comprising the step of displaying the reason a performed speech recognition is unable to recognize the voice response.

21. The method of claim 18, further comprising the step of sending vehicle-related information to the call center.

* * * * *